(12) United States Patent
Ohchi

(10) Patent No.: US 9,502,179 B2
(45) Date of Patent: Nov. 22, 2016

(54) METALLIZED FILM AND METALLIZED FILM CAPACITOR USING SAME

(75) Inventor: Yukikazu Ohchi, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 457 days.

(21) Appl. No.: 14/009,527

(22) PCT Filed: May 22, 2012

(86) PCT No.: PCT/JP2012/003325
§ 371 (c)(1),
(2), (4) Date: Oct. 2, 2013

(87) PCT Pub. No.: WO2012/164867
PCT Pub. Date: Dec. 6, 2012

(65) Prior Publication Data
US 2014/0022697 A1    Jan. 23, 2014

(30) Foreign Application Priority Data
May 31, 2011 (JP) ................. 2011-121363

(51) Int. Cl.
| | |
|---|---|
| *H01G 4/32* | (2006.01) |
| *H01G 4/06* | (2006.01) |
| *H01G 4/20* | (2006.01) |
| *B32B 15/08* | (2006.01) |
| *B32B 27/00* | (2006.01) |
| *H01G 4/015* | (2006.01) |
| *H01G 4/18* | (2006.01) |

(52) U.S. Cl.
CPC .............. *H01G 4/015* (2013.01); *H01G 4/18* (2013.01); *H01G 4/32* (2013.01); *Y02T 10/7022* (2013.01); *Y10T 428/31533* (2015.04); *Y10T 428/31681* (2015.04); *Y10T 428/31699* (2015.04)

(58) Field of Classification Search
CPC .......... H01G 4/30; H01G 4/015; H01G 4/20; H01G 4/32; B32B 15/08; H01K 1/0346
USPC ...... 361/301.5, 311, 312; 428/458, 463, 419
See application file for complete search history.

(56) References Cited

U.S. PATENT DOCUMENTS

2009/0185326 A1*  7/2009  Kato .................... H01G 4/015
361/301.4

FOREIGN PATENT DOCUMENTS

| JP | 05-243085 A | 9/1993 |
|---|---|---|
| JP | 07-026193 A | 1/1995 |
| JP | 2000-208358 A | 7/2000 |
| JP | 2000-216043 A | 8/2000 |

OTHER PUBLICATIONS

International Search Report issued in International Application No. PCT/JP2012/003325 with Date of mailing Aug. 21, 2012.

\* cited by examiner

*Primary Examiner* — Eric Thomas
*Assistant Examiner* — Arun Ramaswamy
(74) *Attorney, Agent, or Firm* — McDermott Will & Emery LLP

(57) ABSTRACT

A metallized film composed of a dielectric film, a metal thin film layer and a dielectric layer, the metal thin film layer being formed on at least one surface of the dielectric film, the dielectric layer being formed on the metal thin film layer, and the dielectric layer being composed of acrylic acid ester resin as a main component being composed of dimethylol tricyclodecane diacrylate and monoacrylate containing a heterocycle.

8 Claims, 2 Drawing Sheets

METALLIZED FILM AND METALLIZED FILM CAPACITOR USING SAME

RELATED APPLICATIONS

This application is the U.S. National Phase under 35 U.S.C. §371 of International Application No. PCT/JP2012/003325, filed on May 22, 2012, which in turn claims the benefit of Japanese Application No. 2011-121363, filed on May 31, 2011, the disclosures of which Applications are incorporated by reference herein.

TECHNICAL FIELD

The present invention relates to a metallized film capacitor to be used for a variety of electronic devices, electrical apparatus, industrial equipment and automobile, suitably used for smoothing an inverter circuit for driving a hybrid car motor, a filter and a snubber. The present invention also relates to a metallized film to be used for the capacitor.

BACKGROUND ART

In recent years, from a perspective of environment protection, many kinds of electrical apparatus are equipped with an inverter circuit for achieving energy conservation and a high efficiency. Especially in an automotive industry, a hybrid electric vehicle (hereinafter, HEV) running with both an electric motor and a combustion engine is introduced into the market. In this circumstance, engineering development for protecting a global environment, saving energy and achieving a high efficiency are being progressed.

A working voltage range of the electric motor for HEV is as high as several hundred. Therefore, a metallized film capacitor having a high withstanding voltage and a low loss characteristics attracts attention as a capacitor to be used for the electric motor. As market requirement for free of maintenance is high, the metallized film capacitor having an extremely long life is being employed in this regard, too.

Among metallized film capacitors, a metallized film capacitor having a metallized electrode formed on a dielectric film has a smaller volume of the electrode than one having a metal foil electrode, so the capacitor is miniaturized and light-weighted. Moreover, the metallized electrode has a unique self-healing characteristic, providing a high reliability against dielectric breakdown. Therefore, the capacitor has been used widely.

As an example of the metallized film, a configuration of conventional metallized film 100 is shown in FIG. 3. FIG. 3 is a cross sectional view of conventional metallized film 100.

Metallized film 100 includes dielectric film 101, metal thin film layer 102 and dielectric layer 104. Metal thin film layer 102 is chiefly made of aluminum deposited on both surfaces of dielectric film 101 by such as a vapor deposition or an ion plating method. Margin 103 is a portion free from metal thin film layer 102. Dielectric layer 104 is formed by applying a dielectric coating to one or both surfaces of dielectric film 10 The coating is formed by dissolving one of polycarbonate, polyphenylene oxide and polyalylate into an organic solvent. Margin 105 is a portion free from dielectric layer 104. After the dielectric coating is applied, the organic solvent contained in the dielectric coating as a diluent is vaporized and dried out, thus metallized film 100 is completed. As the organic solvent, at least one or two of dichloromethane, dichloroethane and trichloroethylene are properly selected for use.

As described, in order to make metallized film 100, a polymer compound to be used for forming dielectric layer 104 is dissolved into an organic solvent and the solution is applied to the dielectric film to form the dielectric layer. For this reason, a heat source and a cooling apparatus for vaporizing and removing the organic solvent are required, or a high performance organic solvent recovering apparatus is required.

PLT 1 proposes to form a dielectric film by using an ultrasonic curing resin as a dielectric coating, therewith forming dielectric film 200 shown in FIG. 4. Namely, metallized film 200 is made as followings. First, metal thin film layer 202 chiefly made of aluminum and margin 203 free from metal thin film layer 202 are formed on both surfaces of dielectric film 201 by such as a vapor deposition method or an ion plating method. Then, the ultraviolet curing coating is applied to at least one surface of dielectric film 201, and then the ultraviolet curing coating is hardened with ultraviolet irradiation, so as to form dielectric layer 204.

The ultraviolet curing coating making up dielectric layer 204 is composed of ultraviolet curing resin added by photopolymerization initiator which promotes curing reaction of the ultraviolet curing resin. That is, the coating does not contain organic solvent, so aforementioned problem related to use of the organic solvent is not caused.

CITATION LIST

Patent Literature

PTL1: Japanese Patent Unexamined Publication No. H05-243085

SUMMARY OF THE INVENTION

The invention is designed to prevent a crack from occurring in a dielectric layer when producing a metallized film, therewith to provide a metallized film capacitor having a superior capacitor performance.

The metallized film of the invention includes a dielectric film, a metal thin film layer and a dielectric layer. The metal thin film layer is formed on at least one surface of the dielectric film. The dielectric layer is formed on the metal thin film layer. The dielectric layer is chiefly made of acrylic acid ester resin which is composed of dimethylol tricyclodecane diacrylate and monoacrylate containing a heterocycle.

By using the metallized film in this configuration, a possibility of occurrence of crack during manufacturing of the metallized film capacitor is reduced, preventing deterioration in performance of the capacitor.

DESCRIPTION OF EMBODIMENTS

In general, ultraviolet curing resin has a low flexibility and is fragile after it is cured. So, when a wound type metallized film capacitor is manufactured using a metallized film formed with this type of resin, there is a possibility that crack occurs in the dielectric layer formed with this type of ultraviolet curing coating. The crack deteriorates performance of the manufactured metallized film capacitor. When the wound capacitor element is pressed into an oblate shape for space saving purpose, there is also a possibility that crack occurs with the dielectric layer of low flexibility On the other hand, when a stacked type metallized film capacitor is manufactured, the metallized film is wound around a fairly large ring-shape bobbin, to form a wound body. The wound body is then pressed into an oblate shape and then cut into individual pieces by a saw blade. With this manufacturing method, a plurality of metallized film capacitors is produced at one time. However, since the dielectric layer formed with the ultraviolet curing coating is fragile, crack is also likely to occur in the dielectric layer when the wound body is cut by the saw blade, as it happens with the wound type metallized film capacitor. As a result, capacitor characteristics of the manufactured metallized film capacitor are deteriorated.

Figure 1:
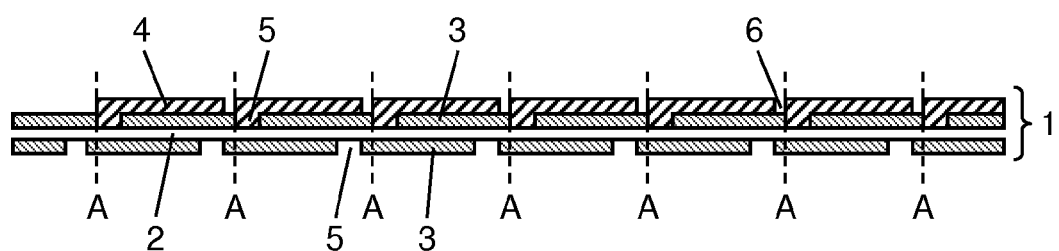
FIG. 1 is a cross sectional view of a metallized film according to an exemplary embodiment of the present invention.
Figure 2:
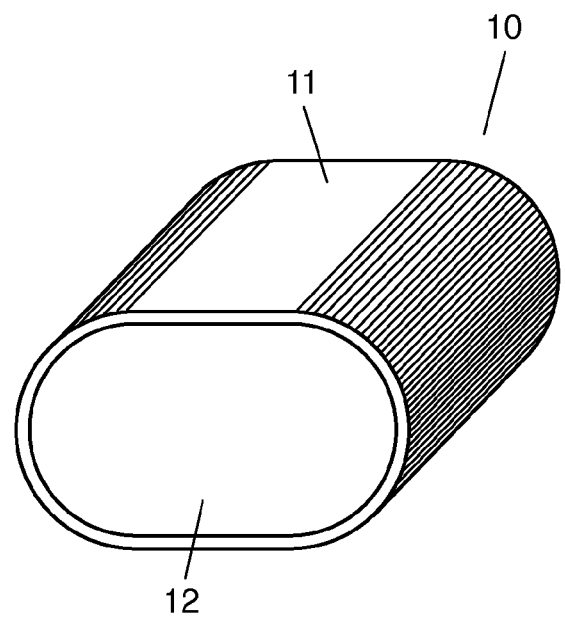
FIG. 2 is a perspective view of a metallized film capacitor according to the exemplary embodiment of the present invention.
Figure 3:
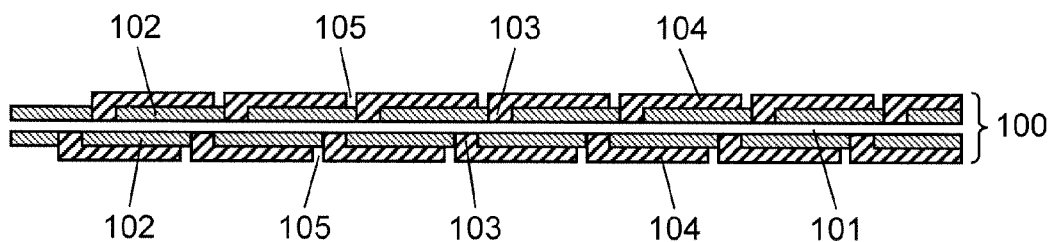
FIG. 3 is a cross sectional view of a conventional metallized film.
Figure 4:
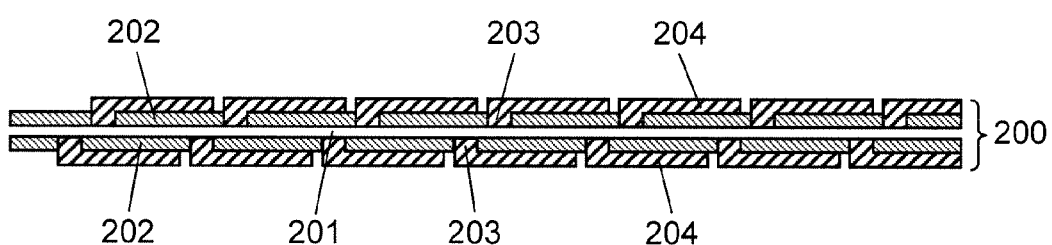
FIG. 4 is a cross sectional view of another conventional metallized film.

Hereinafter, a configuration solving the problem is explained with reference to drawings. FIG. 1 is a schematic cross sectional view showing the configuration of a metallized film according to an exemplary embodiment of the present invention. FIG. 2 is a perspective view of the metallized film capacitor according to the exemplary embodiment of the present invention.

As shown in FIG. 1, metallized film 1 includes dielectric film 2, metal thin film layer 3 and dielectric layer 4. Metal thin film layer 3 is made of aluminum as a main component and is formed on both surfaces of dielectric film 2. Metal thin film layer 3 can be formed of other metal than aluminum, such as zinc, magnesium and silicon. Metal thin film layer 3 may be formed on only one surface of dielectric film 2. In this case, a metal layer is formed on an opposite surface of the dielectric film, opposite to the surface whereon metal thin film layer 3 is formed; metal thin film layer 3 and the metal layer constitute a positive-and-negative pair of electrodes. This metal layer may be formed of aluminum, zinc, magnesium, silicon, or an alloy of these metals, or a metal thin film layer formed on a surface of another dielectric film may be utilized instead. Dielectric layer 4 is formed on at least one of the pair of metal thin film layers 3. Herein, the main component is defined to be a component having the largest weight ratio among component constituting metal thin film layer 3, at least 55 wt %, for instance.

Dielectric film 2 is a sheet made of polypropylene resin about 2.8 µm thick, for an example. Metal thin film layer 3 is formed by a vapor deposition method as an example. As shown in FIG. 1, metal thin film layer 3 is divided by margin 5. Margin 5 is formed by applying margin oil in a prescribed pattern, preventing metal particles to attach when the vapor deposition is performed. Dielectric film 2 may be formed of polyethylene terephthalate resin, polyethylene naphthalate resin or polyphenylene sulfide resin, instead of polypropylene resin. As a deposition method, an ion plating method may be employed other than the vapor deposition method.

Dielectric layer 4 is formed so as to cover metal thin film layer 3 that is formed on dielectric film 2. FIG. 1 shows dielectric layer 4 is formed on only one surface of dielectric film 2, however it may be formed on both surfaces. Dielectric layer 4 is formed by hardening a dielectric coating chiefly made of acrylic acid ester resin which is one of ultraviolet curing resin, with ultraviolet irradiation, and is also filled in margin 5 as shown in FIG. 1.

Margin 6 is a portion free from dielectric layer 4, simultaneously formed with dielectric layer 4. Margin 6 is formed by masking in advance before the dielectric coating is applied. A role of margin 6 will be explained later.

Next, the dielectric coating forming dielectric layer 4 is described. The dielectric coating used for metallized film 1 is made of acrylic acid ester resin as a main component, which is obtained by mixing dimethylol tricyclodecane diacrylate (hereinafter, DMTCDA) shown in chemical formula (1) and tetrahydrofurfuryl acrylate (hereinafter, THFA) shown in chemical formula (2). Herein, the main component is defined to be a component having in the largest weight ration among components constituting the dielectric coating, at least 90 wt %, for instance.

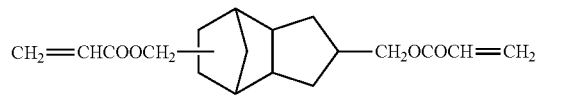

$$CH_2=CHCOOCH_2 \text{—} \bigcirc \text{—} CH_2OCOCH=CH_2 \quad (1)$$

$$CH_2=CHCOOCH_2 \text{—} \bigcirc \quad (2)$$

The above dielectric coating is added by 2-methyl-1[4-(methylthio) phenyl]-2-morpholinopropane-1-one shown in chemical formula (3) as a photopolymerization initiator for accelerating hardening of acrylic acid ester resin with ultraviolet irradiation. When forming the dielectric coating, weight ratio between acrylic acid ester resin and 2-methyl-1[4-(methylthio)phenyl]-2-morpholinopropane-1-one is adjusted to 100:2, for example, the mixture is stirred up to be completely dissolved.

$$H_3C\text{—}S\text{—}\bigcirc\text{—}\underset{CH_3}{\overset{CH_3}{C}}\text{—}N\bigcirc O \quad (3)$$

Above dielectric coating is further added by ethylene-vinyl acetate copolymer shown in chemical formula (4) which is a thermoplastic resin for accelerating adhesive strength between the layers of metallized film capacitor 10. The ethylene-vinyl acetate copolymer resin is added so that weight ration becomes 100:1 when the dielectric coating including above mentioned photopolymerization initiator is 100 in weight ration.

$$\text{—}(CH_2\text{—}CH_2)_m\text{—}(CH_2\text{—}CH_2)_n\text{—} \quad (4)$$
$$|$$
$$O$$
$$|$$
$$C=O$$
$$|$$
$$O\text{—}CH_3$$

As described above, the dielectric coating is prepared by blending acrylic acid ester resin, photopolymerization initiator and thermoplastic resin. The finished dielectric coating is applied by a micro gravure coater onto dielectric film 2 on which metal thin film layer 3 is formed. The coating is hardened by ultraviolet rays radiated from a high pressure mercury lamp in an ultraviolet curing oven filled with nitrogen gas where oxygen is included in a density of at most 900 ppm. That is, dielectric layer 4 is chiefly made of acrylic acid ester resin which is composed of DMTCDSA and THFA. Metallized film 1 is produced as described above.

Above described dielectric coating contains THFA having a low viscosity, so dielectric layer 4 has a very high flexibility. Crack that may be caused with the wound type metallized film capacitor when it is wound or the laminated type metallized film capacitor when it is cut into pieces is therefore reduced.

Evaluation results on the flexibility of dielectric layer 4 of metallized film 1 are shown hereinafter. For evaluating the flexibility, evaluation sample pieces are prepared. Dielectric coating prepared by each prescribed weight ratio described below is put in a Teflon (registered trade mark) vessel of 20 mm long, 10 mm wide and 10 mm deep and irradiated by ultraviolet rays for hardening. For evaluating flexibility, a tension test is conducted on each sample and Young' modulus (Young's modulus E=stress σ/distortion (%)=change in load (N)/thickness (μm)/elongation (%)) is measured. A bending test is also conducted, in which a load of 50 grams is applied to one end of the evaluation sample to find out presence or absence of crack.

(Sample EA)
Weight ratio between DMTCDA and THFA constituting acrylic acid ester resin as the main component of the dielectric coating is adjusted to 95:5. The sample is made of the dielectric coating with the aforementioned method.

(Sample EB)
Weight ratio between DMTCDA and THFA constituting acrylic acid ester resin as the main component of the dielectric coating is adjusted to 90:10. The sample is made of the dielectric coating with aforementioned method.

(Sample EC)
Weight ratio between DMTCDA and THFA constituting acrylic acid ester resin as the main component of the dielectric coating is adjusted to 80:20. The sample is made of the dielectric coating with aforementioned method.

(Sample ED)
Weight ratio between DMTCDA and THFA constituting acrylic acid ester resin as the main component of the dielectric coating is adjusted to 70:30. The sample is made of the dielectric coating with aforementioned method.

(Sample EE)
Weight ratio between DMTCDA and THFA constituting acrylic acid ester resin as the main component of the dielectric coating is adjusted to 50:50. The sample is made of the dielectric coating with aforementioned method.

(Sample CA)
Only DMTCDA is used to constitute acrylic acid ester resin as the main component of dielectric coating. Difference from samples EA to EE is that this dielectric coating does not contain THFA. The sample is made of the dielectric coating with aforementioned method.

(Sample CB1)
DMTCDA and 2-ethyl hexyl acrylate (hereinafter, EHA) are used to constitute acrylic acid ester as the main component of dielectric coating. The dielectric coating contains EHA instead of THFA, which is different from samples EA to EE. EHA has a property of low viscosity as THFA has. Weight ratio between DMTCDA and EHA is adjusted to 90:10. The sample is made of the dielectric coating with aforementioned procedure.

(Sample CB2)
DMTCDA and EHA are used to constitute acrylic acid ester resin as the main component of the dielectric coating. Weight ratio of DMTCDA and EHA is adjusted to 50:50. The sample is made of the dielectric coating with aforementioned procedure.

A tensile strength of each of samples EA to EE, CA, CB1 and CB2 is measured. Evaluation results on flexibility are shown in Table 1. In Table 1, main constituent agent of sample EA to EE, CB1 and CB2 is DMTCDA.

TABLE 1

| Sample | Sub Agent | Main Agent:Sub Agent | Young's Ratio | Bending Test |
|---|---|---|---|---|
| EA | THFA | 95:5 | 8.5 | NP |
| EB | THFA | 90:10 | 6.0 | NP |
| EC | THFA | 80:20 | 3.8 | NP |
| ED | THFA | 70:30 | 2.1 | NP |
| EE | THFA | 50:50 | 1.2 | NP |
| CA | THFA | — | 13.5 | Crack |
| CB1 | EHA | 90:10 | 8.7 | Crack |
| CB2 | EHA | 50:50 | 2.2 | Crack |

THFA: tetrahydrofurfuryl acrylate
EHA: 2-ethyl hexyl acrylate
NP: No Problem

As is clearly shown in Table 1, Young's ratio of sample CA, in which acrylic acid ester resin is composed of only DMTCDA, is 13.5. This value is higher than other samples of EA to EE, CB1 and CB2 in which low viscosity acrylate THFA or EHA is added.

Therefore, sample CA deforms less when applied with stress, which means flexibility of the sample is not good. Evidently, crack is occurred in the bending test. As shown, with the metallized film capacitor using the metallized film CA which acrylic acid ester resin is composed of only DMTCDA, crack is easily generated.

In sample EB, weight ratio between DMTCDA and THFA is 90:10. Likewise, in sample CB1, weight ratio between DMTCDA and EHA is 90:10. With these samples, although THFA and EHA are mixed in the identical ratio, sample EB containing THFA exhibits slightly smaller Young's ratio.

With sample EE and sample CB2, the main agent and the sub agent are mixed in an identical weight ratio of 50:50, but Young's ratio is measured 1.2 and 2.2. Young's ratio of sample EE is evidently smaller.

As indicated above, THFA is particularly preferable to use among acrylates. When manufacturing metallized film capacitor 10 employing metallized film 1 composed of acrylic acid ester resin mixed with the sub agent of THFA, cracking probability is greatly decreased than when manufacturing the metallized film capacitor with a metallized film composed of acrylic acid ester resin mixed with the sub agent of a conventional acrylate.

These evaluation results indicate that metallized film 1 prevents occurrence of crack in dielectric layer 4 when manufacturing a metallized film capacitor. That is, by using metallized film 1, metallized film capacitor 10 having excellent capacitor characteristics can be manufactured.

Hereinafter, measurement results on dielectric loss angle (tan δ) of sample EA to EE, CA, CB1 and CB2 are shown in Table 2.

TABLE 2

| Sample | Sub Agent | Main Agent:Sub Agent | Tan δ |
|---|---|---|---|
| EA | THFA | 95:5 | 0.8 |
| EB | THFA | 90:10 | 0.8 |
| EC | THFA | 80:20 | 0.8 |
| ED | THFA | 70:30 | 0.9 |
| EE | THFA | 50:50 | 1.2 |
| CA | THFA | — | 0.8 |
| CB1 | EHA | 90:10 | 0.8 |
| CB2 | EHA | 50:50 | 2.0 |

THFA: tetrahydrofurfuryl acrylate
EHA: 2-ethyl hexyl acrylate

As is evidently shown in Table 2, samples EA to ED, CA, and CB1 exhibit a small dielectric loss angle of around 0.8.

On the other hand, with sample EE and CB2, dielectric loss angle is slightly higher as 1.2 and 2.0 although these values are not a problem for a practical use. As comparing sample EE and sample CB2, sample EE is superior in dielectric loss angle to sample CB2. It means that metallized film capacitor 10 manufactured with metallized film 1 which is composed of acid ester resin containing the sub agent of THFA is superior in performance to the metallized film capacitor manufactured with the metallized film composed of acrylic acid ester resin containing a conventional acrylate as the sub agent.

The evaluation results in Table 1 and Table 2 show that when DMTCDA is mixed THFA to constitute the main component of acryl acid ester resin of the dielectric coating in a manner that the weight ratio of DMTCDA with respect to a sum of DMTCDA and THFA is at least 0.5 and at most 0.95, metallized film 1 shows no practical problem in capacitor characteristics and exhibits a reduced occurrence of crack.

It is more preferable that the weight ratio of DMTCDA with respect to the sum of DNTCDA and THFA is 0.7 or greater and 0.9 or less. In this case, metallized film 1 superior both in flexibility and dielectric loss angle is obtained as indicated by Table 1 and Table 2. By using this kind of metallized film 1, metallized film capacitor 10 having superior capacitor characteristics can be manufactured.

In the embodiment of the present invention, acrylic acid ester resin, photopolymerization initiator and thermoplastic resin are listed as constituents of the dielectric coating, but additives such as an adhesive agent and a leveling agent may be added to it upon necessity.

Next, metallized film capacitor 10 using metallized film 1 is described with reference to FIG. 2. Metallized film capacitor 10 has wound body 11 formed by winding metallized film 1, and metallikon electrode 12 made by metallizing end faces of wound body 11 with zinc, for instance. Namely, a pair of metallikon electrodes 12 are formed on both end faces in an axial direction of winding of wound body 11. Metallikon electrode 12 may be formed with tin-zinc alloy or the like, instead of zinc.

In manufacturing metallized film capacitor 10, metallized film 1 is cut in a longitudinal direction along margin 6, and then the cut metallized film piece is wound up respectively. Broken lines A in FIG. 1 show the cut lines.

If dielectric layer 4 as an insulator exists in margin 6, it blocks contact between metal thin film layer 3 and metallikon electrode 12, making their electrical connection difficult. In other words, margin 6 is formed to ensure electrical connection between metal thin film layer 3 and metallikon electrode 12.

In the configuration shown in FIG. 2, a cross section of wound body 11 perpendicular to the axial direction of winding has an oblate shape. Namely, metallized film capacitor 10 is formed in the oblate shape. After metallized film 1 is wound around a winding shaft to form a cylindrical shape, the winding shaft is removed out to hollow a center of the body. The body is then pressed from both sides so as to sandwich the body and formed into the shape of wound body 11. A reason that the wound body is hollowed is to make pressing of the body easy.

When pressing, crack may occur in dielectric layer 4 if flexibility of metallized film 1 is low. Since stress is mainly applied to the center part of a track of the flat-shaped metallized film capacitor 10, crack is generated more often around the center.

Table 3 shows a status of occurrence of crack in dielectric layer 4 of the metallized film samples EA to EE, CA, CB1 and CB2 assembled in the flat type metallized film capacitor shown in FIG. 2.

TABLE 3

| Sample | Sub Agent | Main Agent:Sub Agent | Occurrence of Crack |
|---|---|---|---|
| EA | THFA | 95:5 | Absent |
| EB | THFA | 90:10 | Absent |
| EC | THFA | 80:20 | Absent |
| ED | THFA | 70:30 | Absent |
| EE | THFA | 50:50 | Absent |
| CA | THFA | — | Present |
| CB1 | EHA | 90:10 | Present |
| CB2 | EHA | 50:50 | Absent |

THFA: tetrahydrofurfuryl acrylate
EHA: 2-ethyl hexyl acrylate

As shown in Table 3, presence or absence of crack is correlated with the results of the bending test in Table 1. Namely, crack is not generated in the metallized film capacitors of sample EA to EE and CB2, while crack is generated in those of sample CA and sample CB1.

As comparing sample EB and CB1, EB and CB1 contain THFA and EHA, respectively, in an equal amount (in a weight percentage of 10%). Although crack is not generated in sample EB, crack is generated in sample CB1. On the other hand, in sample EA having less amount of THFA, crack is not generated. Between sample EA and sample CB1, there is only a small difference in Young's ratio as shown in Table 1. With flat type metallized film capacitor 10, however, presence or absence of crack and number of presented crack are greatly different depending on subtle difference in flexibility of dielectric layer 4. Therefore, it is important for the flat type metallized film capacitor 10 to improve flexibility of dielectric film 4 as much as possible. As is shown, THFA improves flexibility of dielectric layer 4 than EHA, much decreasing occurrence of crack.

As described above, by using the dielectric coating made of acrylic acid ester resin as the main component prepared by mixing THFA of low viscosity with DMTCDA, viscosity of the dielectric coating is reduced to an appropriate level for coating. It also moderates a tendency that the ultraviolet curing resin becomes fragile after being hardened.

In above, use of THFA as a sub agent of acrylic acid ester resin is explained, however, the sub agent is not restricted to it. Other monoacrylate including a heterocycle may be used as a sub agent of acrylic acid ester resin. Some examples of such monoacrylate are tetrahydrofurfuryl methacrylate shown in chemical formula (5) and monoacrylate shown in chemical formulae (6) to (10) below.

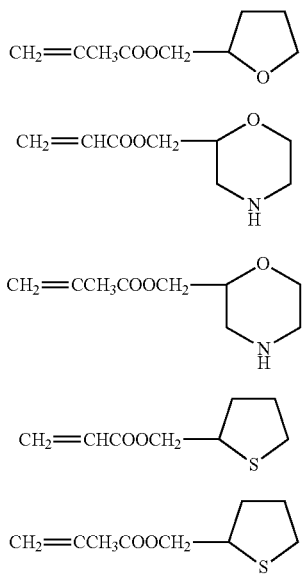

Even the monoacrylate including a heterocycle is hardened to form dielectric layer 4, arrangement of molecules in the resin stays random thanks to steric hindrance due to heterocycle and thus the monoacrylate is hardly crystallized. Therefore, dielectric layer 4 remains soft, preventing a crack to generate.

INDUSTRIAL APPLICABILITY

The metallized film of the present invention effectively inhibits a crack to generate in a dielectric layer when manufacturing a metallized film capacitor, providing a metallized film capacitor with a superior performance. The metallized film of the present invention is suitably used in manufacturing a metallized film capacitor, which is used for various kinds of electronic device, electrical apparatus, industrial equipment and automobiles. In particular, a flat-shaped metallized film capacitor is preferably used by automotive industry in many quantities where space saving is demanded. Thus, the present invention has a very important position in the automotive industry where development of HEV is being progressed.

The invention claimed is:
1. A metallized film comprising:
a dielectric film;
a metal thin film layer formed on at least one surface of the dielectric film; and
a dielectric layer formed on the metal thin film layer,
wherein the dielectric layer is chiefly made of acrylic acid ester resin that includes dimethylol tricyclodecane diacrylate and monoacrylate containing a heterocycle.
2. The metallized film according to claim 1,
wherein the monoacrylate containing a heterocycle is tetrahydrofurfuryl acrylate.
3. The metallized film according to claim 2,
wherein a weight ratio of the dimethylol tricyclodecane diacrylate to a sum of the dimethylol tricyclodecane diacrylate and the tetrahydrofurfuryl acrylate contained in the acrylic acid ester resin is within a range of at least 0.7 and at most 0.9, inclusive.
4. The metallized film according to claim 1,
wherein the dielectric film is made of one of polypropylene resin, polyethylene terephthalate resin, polyethylene naphthalate resin and polyphenylene sulfide.
5. A metalized film capacitor comprising:
a wound body formed by winding the metallized film according to claim 1; and
metallikon electrodes formed on both end faces of the wound body in an axial direction of the winding, respectively,
wherein the metallized film further includes a metal layer formed on an opposite surface of the dielectric film to a surface on which the metal thin film layer is formed.
6. The metallized film capacitor according to claim 5,
wherein a cross section of the wound body perpendicular to the axial direction of the winding has an oblate shape.
7. The metallized film capacitor according to claim 5,
wherein the monoacrylate containing the heterocycle is tetrahydrofurfuryl acrylate.
8. The metallized film capacitor according to claim 5,
wherein the metallikon electrodes are formed by metal spray.

* * * * *